(12) United States Patent
Vogel et al.

(10) Patent No.: US 7,491,368 B2
(45) Date of Patent: Feb. 17, 2009

(54) METHOD FOR TEMPORARY CLOSING AND REOPENING OF A REACTOR TUBE

(75) Inventors: Keith L. Vogel, Nassau Bay, TX (US); Michael A. Middleton, League City, TX (US)

(73) Assignee: Equistar Chemicals, LP, Houston, TX (US)

( * ) Notice: Subject to any disclaimer, the term of this patent is extended or adjusted under 35 U.S.C. 154(b) by 673 days.

(21) Appl. No.: 11/181,081

(22) Filed: Jul. 14, 2005

(65) Prior Publication Data

US 2007/0014701 A1    Jan. 18, 2007

(51) Int. Cl.
*G05B 9/05*    (2006.01)
(52) U.S. Cl. ............... 422/118; 422/117; 422/198; 29/727; 29/890.031; 549/523; 549/534

(58) Field of Classification Search ............ 29/727, 29/890.031; 422/138, 198, 117, 118
See application file for complete search history.

(56) References Cited

U.S. PATENT DOCUMENTS

| 5,566,444 | A * | 10/1996 | Shim et al. ............ 29/727 |
| 6,373,914 | B1 * | 4/2002 | Gill et al. ............ 376/245 |
| 6,727,389 | B1 | 4/2004 | Viswanathan ............ 564/477 |

* cited by examiner

*Primary Examiner*—Bernard Dentz
*Assistant Examiner*—David E Gallis
(74) *Attorney, Agent, or Firm*—Roderick W. MacDonald

(57) ABSTRACT

A method for deliberately plugging the inlet and outlet ends of a reactor tube in a recoverable manner, which method employs at least one vented plug whereby fluid communication within the tube can be established or terminated at will, and the tube is unplugged only after the fluid content of the tube has been drained through the vented plug.

9 Claims, 5 Drawing Sheets

METHOD FOR TEMPORARY CLOSING AND REOPENING OF A REACTOR TUBE

BACKGROUND OF THE INVENTION

This invention relates to a method for temporarily sealing (closing) a dysfunctional reactor tube, and later reopening the closed tube for remediation work that will allow the tube to be put back into use in a reactor. This invention is particularly applicable to reactor tubes that contain, at least in part, at least one catalyst body wherein the catalyst body is made up of a plurality of individual catalyst members (elements).

DESCRIPTION OF THE PRIOR ART

Although for the sake of clarity and brevity this invention is described in terms of an ethylene oxide production plant, this invention is not so limited and is broadly applicable to the remediation of reactor tubes in general.

In a conventional ethylene oxide production plant, ethylene and oxygen are reacted at an elevated temperature of from about 450 to about 550 degrees Fahrenheit (F) under a pressure of from about 200 to about 325 psig in the presence of a catalyst to form ethylene oxide (EO). The reaction takes place in a plurality of elongated tubes that contain a body of particulate catalyst. The reaction is fast, on the order of about one second, and high yielding, approaching 90%. The EO reaction product is normally gaseous and contains newly formed EO, unreacted ethylene and oxygen, and various by-products, but mainly carbon dioxide.

The EO is separated from the unreacted ethylene and oxygen, and by-products in a water-wash column (EO scrubber) in the manner of a solvent recovery process. The EO is absorbed by the water, and the ethylene and by-products are not. The EO/water solution is then steam stripped and purified by fractionation. The by-products and ethylene are split with the ethylene being recycled to the reactor that forms EO aforesaid, and the carbon dioxide, etc., being separately recovered for other use. This process yields about 1.4 pounds of EO per pound of ethylene feed at high yields, e.g., about 89%. This process is well known in the art and further detail is not necessary to inform the art. However, more detail may be found in U.S. Pat. No. 6,727,389.

EO, as a liquid, boils at about 56 F to form a colorless gas at room temperature. It is traded commercially as high purity technical grade, e.g., 99.7% purity. Because of its volatility under normal conditions, care must be given in its storage and transportation to keep it out of the ambient atmosphere.

EO is an intermediary chemical useful for making a number of derivatives of commercial value. The predominant derivative is ethylene glycol or EG (sometimes called monoethylene glycol or MEG to distinguish it from diethylene glycol or DEG, and triethylene glycol or TEG). Other derivatives include ethoxylates used in biodegradable detergents, paint solvents, and the textile industry.

An EO reactor contains a large number, in the thousands, of individual reactor tubes (tube or tubes), each containing at least one body of catalyst. The body of catalyst is made up of a large number of randomly packed catalyst elements (catalyst supported by a form that carries the catalyst, e.g., a solid or hollow right cylinder support form). The tubes themselves are each typically a hollow, right cylinder as shown in detail hereinafter. The tubes, as a whole, are maintained in the reactor at reaction conditions of temperature and pressure while the reactants are passed through the catalyst body carried inside each tube, the desired reaction product being formed during such passage.

Over a period of time in operation, one or more tubes can become degraded as to its operative effect, e.g., become plugged at least in part thus increasing the pressure drop across that tube, or inoperable, e.g., leak undesired material into the interior of the tube where the catalyst body resides. Such tube dysfunctionality or inoperability can be caused by any number of other events well known to operators. The more common examples are catalyst fusing and tube wall leaking. In reactions, such as the EO reaction, that employs an elevated temperature in the reactor, a particular body of catalyst in a specific tube can, for various reasons, fuse together to form a gas impervious block, thereby at least partially, if not totally, blocking the flow of reactants and products through the interior of that tube. In reactors that employ a pressurized material such as a coolant fluid on the exterior of the tubes, an individual tube wall can fail and allow coolant to enter the interior of the tube. This fugitive coolant can create undesired products to be formed in, and thereafter travel with, the reaction product of that tube, a highly undesirable result.

The EO reaction described above is a good example of both types of failures. The EO reaction is exothermic, so the tubes in an EO reactor are exposed on their outer surfaces to high pressure (300 to 900 psig) coolant, e.g., a mixture of liquid water and steam. This coolant will contaminate both the EO catalyst in the tube and the EO products of the process itself if it leaks into the interior of a tube. Some plants employ kerosene or heat transfer oil as a coolant, but at a lower pressure (from about 25 to about 75 psig) in which the leak would be reversed, i.e., the leak would pass from the process side (product side) to the coolant side. In addition, if, for some reason, the reaction in a given tube runs away and the temperature increases to a point that at least some of the catalyst in that tube fuses or otherwise melts or bonds together into a less porous mass, or the reaction forms heavy compounds that deposit on the catalyst and tube wall, the pressure drop in that tube can increase considerably or the tube become plugged altogether.

When undesired fluid such as coolant enters the interior of a tube it is necessary to plug that tube at both its inlet and outlet ends to contain the coolant leak and prevent it from entering the reaction product stream of the reactor in which the leaking tube resides. With coolant leakage or when catalyst fuses in a tube, undesired gases and even liquids of unknown composition can be formed that are also desirably prevented from entering the reaction product stream of the reactor.

Sometimes during the life of the catalyst it is desirable to obtain samples of the catalyst for analysis or performance testing under laboratory conditions. This may be done to investigate catalyst performance problems or potential catalyst poisoning, for example. Often, it is preferable to collect the entire contents of a tube or of numerous tubes for this investigation. The tube or tubes from which the samples are taken may not be damaged in any way, but cannot be operated until the entire catalyst charge is replaced at some time in the future.

Thus, there are a number of events that can cause an operator to plug or otherwise close in a sealing manner one or more tubes in an individual reactor.

It is desirable to plug and abandon the use of a tube in only a temporary manner, as opposed to permanently, so that the tube can later be unplugged and repaired, e.g., removing fused catalyst, fixing a leaking tube wall, and the like. As will be seen later, this is easier said than done.

It is highly desirable if one or more faulty tubes in a reactor can be temporarily closed until a later more convenient time, e.g., reactor turnaround, as opposed to either the inconvenience of immediate repair or the permanent abandonment of such tubes. Temporary abandonment and later remediation of a plurality of tubes allows the operator to keep the reactor at maximum productivity over the life of the reactor. For example, in an EO plant, when the number of tubes in a given reactor that are plugged, and thereby out of operation, reaches as few as 24, an operator starts thinking about getting these tubes back into operation to regain the collective lost productivity of those tubes. This is so whether the inoperable tubes are randomly spread over the lateral cross-section of the reactor or clustered in a localized area of the reactor. In other processes the number of tubes that trigger thoughts of remediation can be larger or smaller in number. In any event, whatever the process, this lost productivity cannot be regained if the tubes cannot be safely re-opened without damage to the tubes or danger to an individual due to the re-opening process itself.

Heretofore, a failed or failing tube has been deliberately sealed by physically driving a tapered, solid metal, e.g., steel, plug into both its inlet and outlet ends thereby isolating the interior of that tube from the reactants and reaction products present in the reactor. Although this approach definitely seals the tube in a manner in which the plug can later be removed without damaging the tube, it is not desirable for temporary abandonment of tubes. This is so because such plugs have to be physically driven into the tube with sufficient force to seal the interior of that tube so that (1) pressurized gas in the reactor cannot later leak around the plugs and enter the tube's interior, and (2) pressurized gas and/or liquid formed in the interior of the tube after sealing of same cannot escape past the plugs into the reactor.

As alluded to before, a plug can remain in a tube at elevated reaction temperature and pressure for a considerable time, e.g., a number of months, until turnaround of the reactor, and considerable pressure and/or liquid can be built up in the tube's interior during that time. The outlet end of a tube plug is loosened by an individual laterally hitting on the plug's protruding end with a hammer. As shown hereinafter, the individual removing this outlet plug must stand in the bottom head space of the reactor and is reaching overhead in order to hit the plug with the hammer. This is an undesirable situation if pressure has built up in the interior of the tube while it was temporarily abandoned. If there is a pressure build-up, particularly when unknown, if the individual loosens the plug too quickly, the interior pressure of the tube can cause the plug suddenly to blow out of the tube downwardly toward that individual with substantial force. If this was not enough, if a liquid of some sort has built up inside the tube during its abandonment, this liquid can be blown under pressure out of the tube onto the individual that is standing below the outlet of the tube where the plug has just been blown out. This can occur with upper plugs as well.

Thus, an individual charged with removing outlet plugs can be endangered not only physically, but also chemically, so, solid plugs are not a desirable method by which to temporarily plug a tube for later remediation.

To overcome the drawbacks aforesaid in respect of the use of a solid metal plug, an expandable metal plug in the form of the common moly-bolt has been employed instead. It has been found in practice that such an expandable plug seals the tube quite well, but, in so doing, deforms to match the interior configuration of the tube so well that, over time, the plug tends to fuse with the tube wall, and form a permanent rather than removable closure, and cannot be removed without causing severe damage to the tube.

It is desirable to be able to abandon only temporarily one or more reactor tubes for reasons beyond the aforesaid concern for lost production from the reactor. For example, tubes used in exothermic processes and containing fused catalyst cannot be emptied and refilled with fresh catalyst at just any time during a reactor's operating cycle while leaving used catalyst in other tubes in the same reactor. For example, in the EO process aforesaid, having a mixture of tubes with used catalyst and tubes with new catalyst would distort the overall operation of the reaction since used catalyst operates at a higher temperature than fresh (new) catalyst. To subject new catalyst to the higher operating temperatures of used catalyst can cause the generation of unacceptably higher temperatures in the fresh catalyst bodies, thus leading to catalyst fusing and/or runaway temperature conditions in the tubes containing fresh catalyst. Such conditions expose the reactor, as a whole, to the risk of post ignition (burning or explosion of reactants and reaction products) in the reactor down stream of the outlet ends of the tubes, i.e., in the bottom head space of the reactor.

Thus, the temporary plugging of a reactor tube for an extended time under elevated reaction conditions followed by safe unplugging of that tube for remediation is not as simple a task as might first be thought. However, it is highly desirable to be able to accomplish such a process, and this invention provides a method to do just that.

SUMMARY OF THE INVENTION

In accordance with this invention there is provided a method for the temporary plugging of at least one reactor tube, even for extended time periods under elevated operating conditions, and reliably and safely opening that tube without damage to same at an opportune time for the repair of the tube by the operator. This method employs closure plugs in the inlet and outlet ends of the tube wherein at least one plug is in fluid communication between the interior and exterior of the tube in a manner such that this fluid communication can be opened or closed at will, opening fluid communication through such plug prior to removing either the inlet or outlet plugs, removing from the interior of the tube any gas and/or liquid that may have collected in the tube during the time period it was closed by the plugs, and thereafter physically removing the inlet and outlet plugs from the tube.

DETAILED DESCRIPTION OF THE INVENTION

Figure 1:
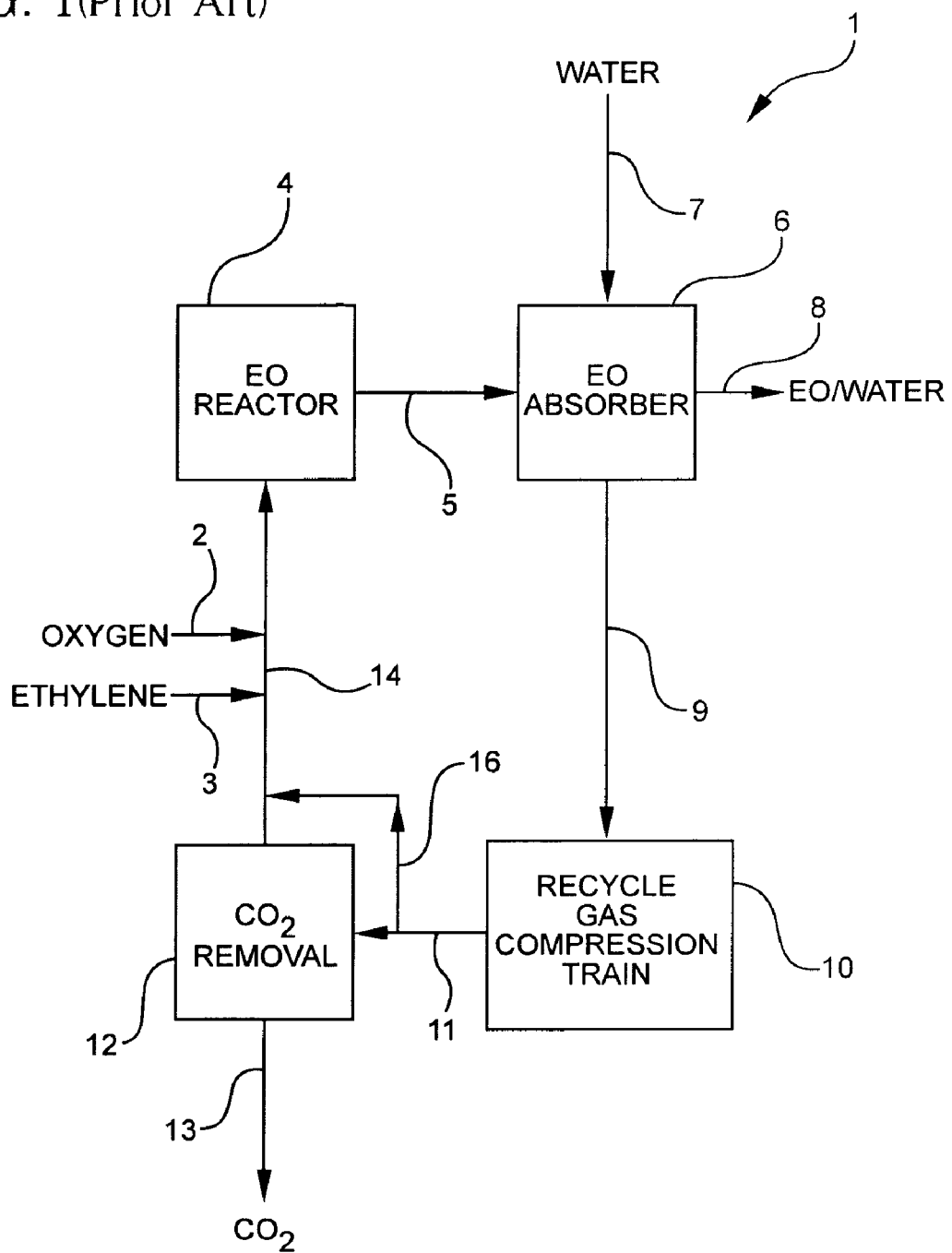
FIG. 1 shows a flow diagram of a conventional EO production plant.

FIG. 1 shows a typical EO production plant 1 unreacted recycle gas 14 is combined with fresh ethylene 3 and oxygen 2 feed streams, and the resulting mixture then introduced into the interior of at least one reactor 4 to form EO in the manner described hereinabove. The normally gaseous reaction product stream in line 5 is composed of EO, unreacted ethylene and oxygen, and by-product (mainly carbon dioxide), and is passed into EO absorber 6. In unit 6, water from line 7 is contacted with stream 5 to extract EO therefrom and to form an EO/water product stream 8. A separate stream in line 9, composed of unreacted ethylene and by-product, is passed to recycle gas compression train unit 10. After compression in unit 10 this stream in part (from about 20 to about 100 percent, molar or by weight) is passed by way of line 11 to carbon dioxide removal system 12 wherein carbon dioxide is absorbed and removed by way of line 13. Unreacted ethylene and oxygen and other components are returned to reactor 4 by way of line 14 as co-feed in that reaction zone.

Absorber 6 is a water wash scrubber that operates like a solvent extractor by absorbing (dissolving) EO out of stream 5 to form EO/water stream 8.

EO/water product stream 8 from absorber 6 is a water stream containing from about 3 to about 5 weight percent (wt. %) EO dissolved therein. Stream 8 is passed to a steam stripper (not shown) wherein stream 8 is steam stripped to remove water therefrom, which water can be returned for reuse in absorber 6 by way of line 7. The product of this steam stripping step can be composed of an about 50/50 by weight mixture of water and EO, and this steam is useful in a number of ways. Often, this stream is subjected to fractional distillation to form an essentially pure EO stream that is recovered as a final product of the process. However, this stream, or a part thereof, can also be used in the formation of one or more glycols, e.g., MEG, DEG, and/or TEG, in known manner.

Figure 2:
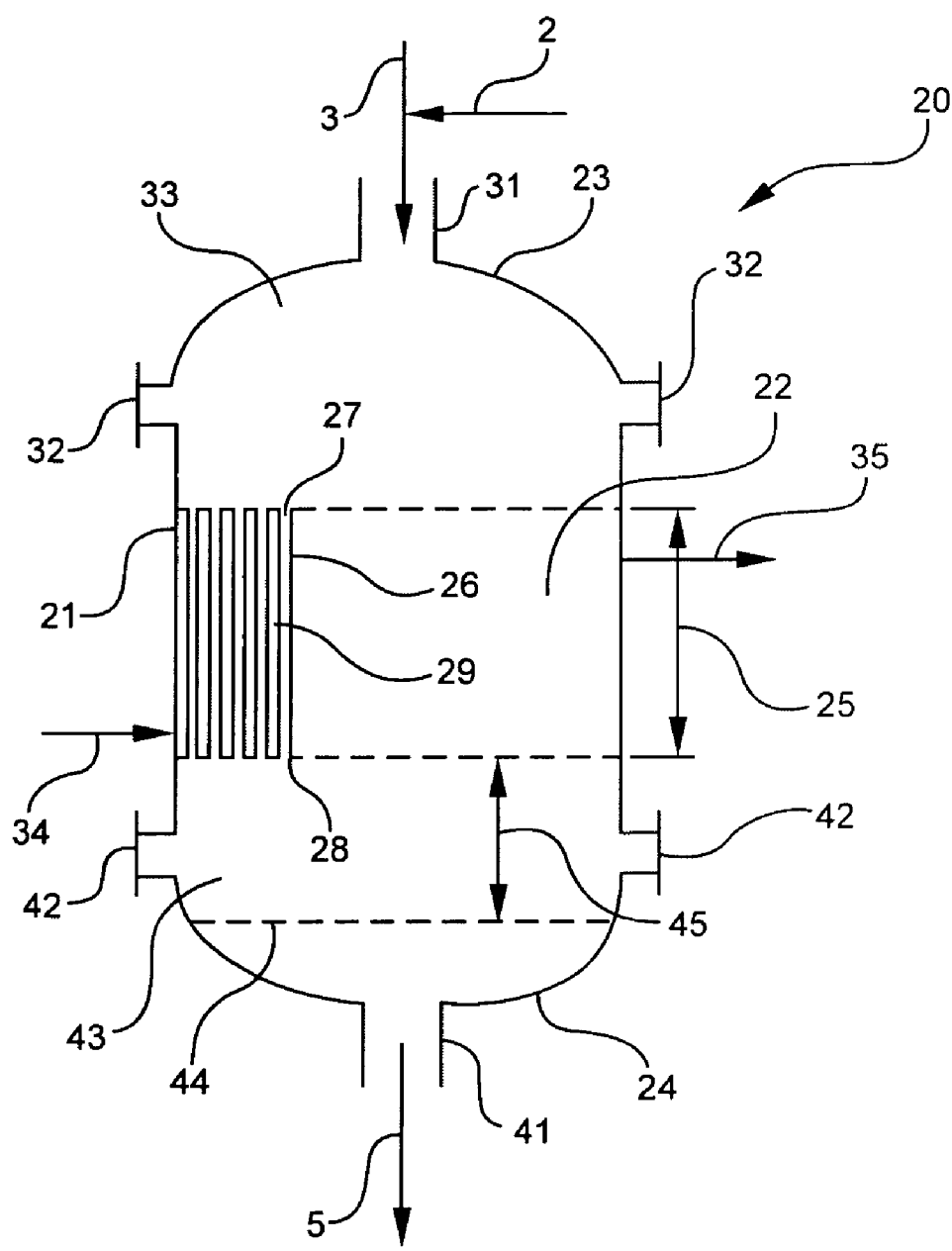
FIG. 2 shows a vertical cross-section of a reactor used in the plant of FIG. 1.

FIG. 2 shows an individual reactor 20 that is useful in unit 4 of FIG. 1. Reactor 20 is composed of an upstanding, curvilinear side 21 that forms a right cylindrical, hollow vessel whose interior volume 22 is closed by upper and lower ends (caps) 23 and 24, respectively. Area 25 of interior 22 contains a plurality of spaced apart, elongated, individual reactor tubes 26. Tube area 25 can contain thousands of individual tubes 26; 6,000 tubes in a typical EO reactor. Each tube 26 has an upper inlet end 27 and a lower outlet end 28 to allow reactants to enter, flow through, and leave the interior volume of each tube 26. The EO reaction being exothermic, coolant means (not shown for sake of clarity) is provided to flow liquid coolant 34, e.g., water, into tube area 22 and around the exterior of tubes 26 in the spaces 29 between adjacent, spaced apart tubes 26. Heated and/or vaporized coolant 35, e.g.; steam, a mixture of steam and liquid water, kerosene, heat transfer liquid, and the like; is removed from tube area 22 for use elsewhere in the plant. In some plants reactors can be operated in the up flow mode in which case the material (fluid) flow would be the reverse of what was just described.

Upper cap 23 carries an inlet portal 31 for the flow of the mixture of oxygen 2 and ethylene 3 into the interior of reactor 1, and man way portals 32 by which an individual can gain access into interior top head space 33 so he can physically reach inlet ends 27 of tubes 26. Some reactors have removable heads for personnel access purposes. Similarly, lower cap 24 carries an outlet portal 41 for the removal of reaction product stream 5 from the interior of the reactor, and man way portals 42 by which an individual can gain access into interior bottom head space 43 for physical access to outlet ends 28 of tubes 26.

Reactor 20 is a large vessel. For example, in an EO reactor, tubes 26 can be from about 20 feet to over 40 feet long so that tube area 25 alone is about 20 feet to over 40 feet tall. Bottom head space 45 between perforated floor 44 (when present) and outlet ends 28 of tubes 26, shown as element 45 in FIG. 2, is typically about 6.5 feet in height, i.e., tall enough for an individual to stand on floor 44 inside head space 43 and reach overhead to pound a plug into or out of a tube outlet end 28. Tubes 26 can be about 1.5 inches in diameter, and when this size, are spaced about 2.5 inches apart (pitch dimensions) so that the lateral diameter of tube area 25 is about 18 feet. These dimensions can vary widely, e.g., the lateral diameter can vary from about 6 feet to over 20 feet.

In operation, reactants 2 and 3 flow into the interior of reactor 20 (the interior of top head space 33) by way of portal 31, then through the interior volumes of tubes 26 into bottom head space 43, and out of reactor 20 by way of portal 41. Tubes 26 each carry a body of catalyst there in, see FIG. 3, which promotes the formation of EO while reactants 2 and 3 pass through the length of tubes 26. The flow of coolant 34 through tube area 25 regulates the temperature of the reactants while in tubes 26 to that desired for the reaction and considering the age of the catalyst in the tubes.

Figure 3:
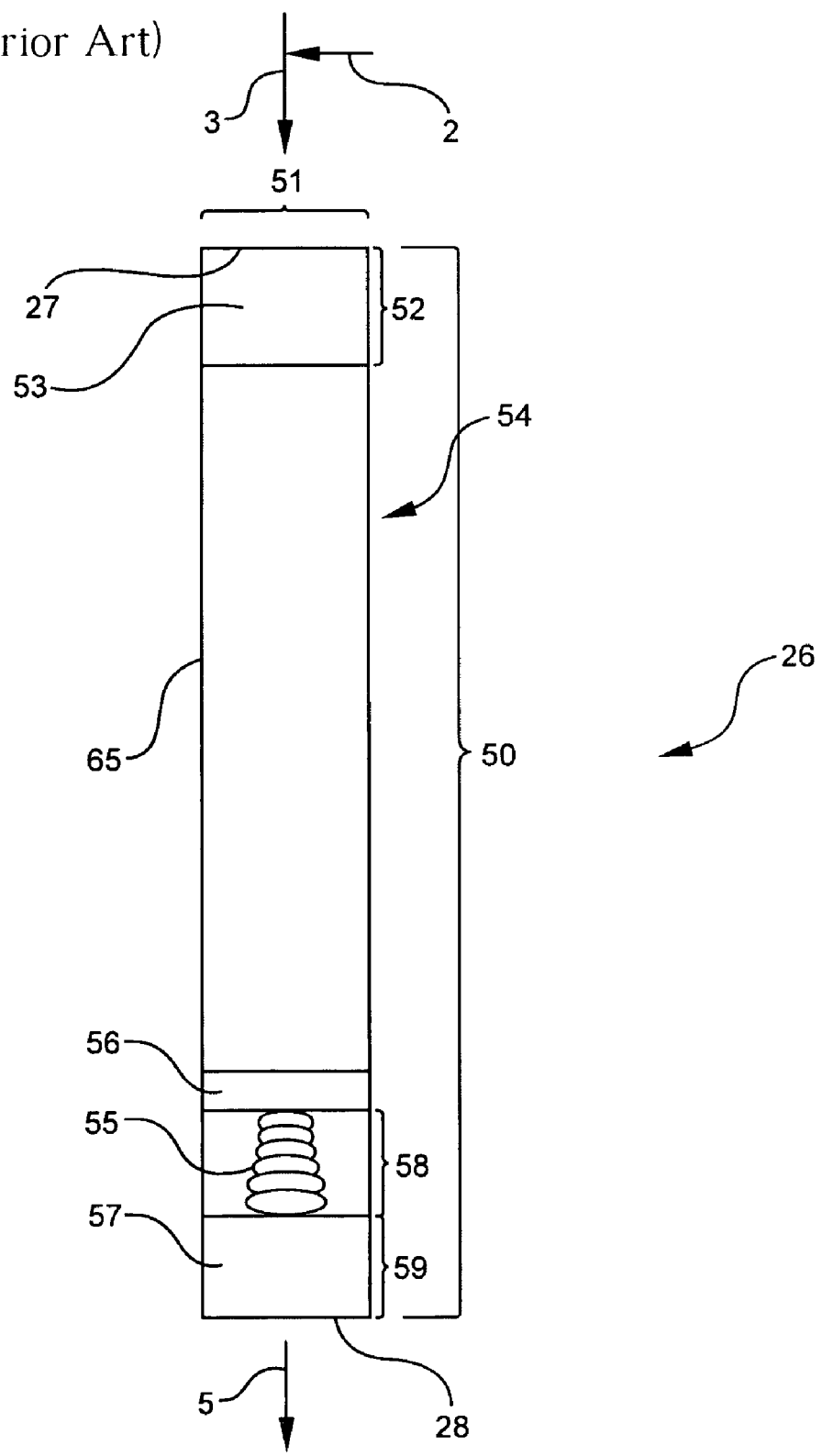
FIG. 3 shows a vertical cross-section of an individual reactor tube used in the reactor of FIG. 2.
Figure 4:
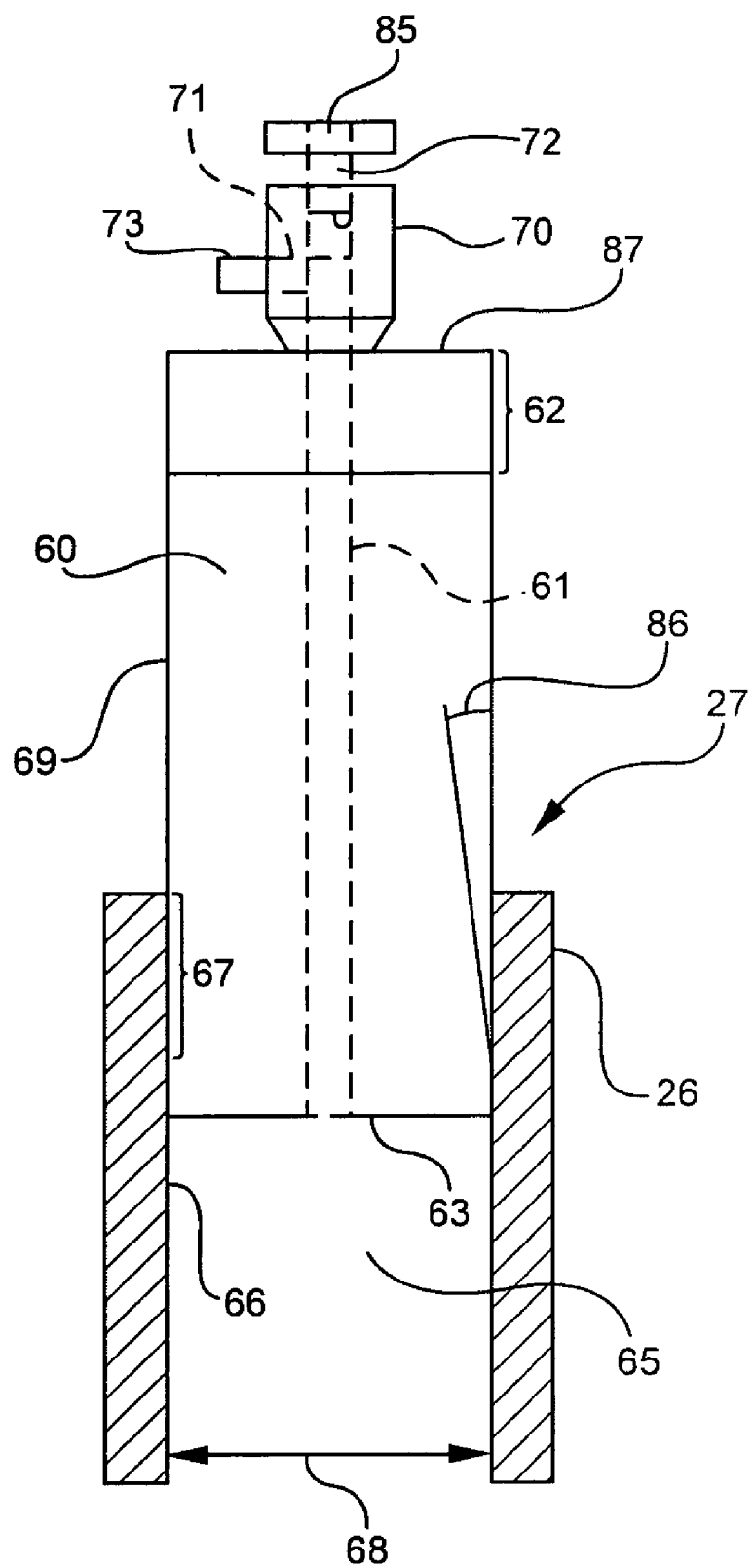
FIG. 4 shows one embodiment of a plug within the method of this invention for establishing fluid communication between the interior and exterior of the tube of FIG. 3.

FIG. 3 shows an individual circular, hollow tube body 26, which body defines the exterior of the tube and an internal (interior) volume 65, see FIG. 4, suitable to receive and hold a catalyst bed and terminates at opposing inlet and outlet ends 27 and 28, inclusive. Tube bodies and plugs with cross-sectional configurations other than circular can be employed in this invention, the circular cross-section being chosen because of its prevalence in practice, and for sake of clarity and brevity. In an EO reactor this tube can have a length 50 of from about 25 to over 40 feet, and a diameter 51 of from about 0.75 to about 1.5 inches. Such a tube can contain in its internal volume from about 10 to about 30 pounds of catalyst. To enhance heat transfer, about 1.5 feet of the upper end 52 of tube 26 contains randomly packed inert elements 53 such as alumina balls or cylinders that carry no catalyst. Below inert element bed 53 is at least one catalyst body 54 that is composed of randomly packed catalyst carrying catalytic elements such as silver on an alumina support element, e.g., a cylindrical (solid or hollow) form. Catalyst bed 54 can extend to a spiral spring support 55 or to another bed of inert elements 57 whose height 56 is from a few inches to several feet. Spring 55 has a height 58, when supporting the beds shown in FIG. 3, of about 5 inches, leaving there below an open internal tube volume 57 of a height 59 of about 7 inches. It is into volume 57 that a plug can be driven for the temporary closure of outlet end 28. To force a plug into the inlet end 27 of that same tube, some of the inert elements must first be removed by the individual who is inserting a plug into that inlet end.

In operation, tube 26 will have circulating around its exterior a cooling fluid that is, for example, at a pressure of from about 300 to about 900 psig, whereas the interior of the tube where the catalyst is carried will be significantly below 300 psig, e.g., up to about 275 psig. Thus, a crack or other breach of the tube wall can allow high pressure coolant to enter catalyst bed 54 with dire consequences to the life of that catalyst bed and to the composition of the reaction products issuing from outlet end 28.

FIG. 4 shows inlet end 27 of tube 26 containing a plug embodiment useful in the method of this invention. In this embodiment, plug 60, unlike the prior art, does not have a solid body. Body 60 is conical, tapered cylinder (frusto-conical) in configuration which will insert at least in part into internal open volume 65, and has an open passage 61 that extends through body 60 to establish fluid communication (venting) between the interior volume 65 of tube 26 and the exterior of tube 26, i.e., in the top head space 31. Surmounted on the top of body 60 is a valve 70.

Passage 61 need not extend completely through the plug body from one end to the opposing end as shown in FIG. 4. If desired, passage 61 could also turn or otherwise curve in the interior of the body of the plug so that the passage exits that body at the side thereof, thereby allowing for a side mounted valve rather than the top mounted valve 70 of FIG. 4. Also, more than one passage 61 can be employed in a plug, if desired.

It should be noted that the method of this invention does not require in all instances the use of a vented plug body in the inlet end of a tube to be plugged temporarily. As described in greater detail hereinafter, a vented plug body can be employed in most, but not necessarily all, instances in the outlet end of a tube to be plugged temporarily. Thus, a vented plug body is shown in FIG. 4 in the inlet end of tube 26 for ease of description and the reader's initial understanding only. Thus, the arrangement for plugging an outlet end of a tube 26 can be envisioned simply by viewing FIG. 4 upside down.

An upper portion 62 of plug 60 is right cylindrical in shape and of a slightly larger diameter than the internal diameter of tube 26. The remainder of plug 60 below portion 62 is tapered inwardly so that the bottom end 63 of plug 60 has a diameter slightly smaller than the internal diameter 68 of tube 26. Plug 60 can then be driven into interior 65 a substantial distance to provide an area 67 of good physical contact between the exterior wall 69 of plug 60 and the interior wall 66 of tube 60. This contact area 67 provides a good seal to prevent pressurized reactants from passing from top head space 33 through contact area 67 into interior 65 of tube 26, and also to prevent pressurized gas in interior 65 from passing out of interior 65 into top head space 33. Thus, contact area 67 should be large enough to prevent leakage in either direction as aforesaid, and also should be sufficient to ensure that plug body 60 does not loosen when left in place over an extended period of reactor operation time, so this contact area should be as large as reasonably possible.

In the method of this invention, body 60 with or without valve 70, is first driven, e.g., by hand with a hammer, into interior 65 of inlet end 27 of tube 26 as shown in FIG. 4. To render the fluid communication afforded by passage way 61 susceptible of being closed and opened at will, valve 70, if not already present, is then installed on body 60 in passage way 61. Valve 70 has a passage way 71 that mates with and otherwise matches and communicates in an open fluid manner with conduit 61 so that fluid communication between interior 65 and top head space 33 is established and maintained when valve 70 is open. More than one passage 71 and more than one valve 70 can be employed on a plug if desired. When valve 70 is closed, see FIG. 5, such open fluid communication is closed off and interior 65 isolated from the exterior of plug 60 in head space 33. Valve 70 is opened and closed by operation, e.g., rotation, of valve stem 72 as discussed later in respect of FIG. 5. Conduit 71 has an external, hollow tubular extension 73 to which a drainage hose can be attached so the fluid content of tube 26 can be removed and collected in a controlled manner or vented to the atmosphere out of contact with the person removing the plugs. Such controlled collection also provides a means by which to transport removed gases and liquids for disposal elsewhere. The collection vessel can contain at least one absorbent such as water for taking up and holding at least part of, or at least certain chemical fractions of, the collected gas/liquid.

A similar set of steps can be employed in the practice of the method of this invention in plugging outlet end 28 of tube 26 with a similar valve vented plug 60. Such a vented plug can be employed in outlet end 28 more often in the practice of this invention, the use of a similarly vented plug in inlet 27 being less frequent. For example, catalyst, when subjected to an unduly high temperature, can fuse in a given tube 26 to an extent that the tube is blocked (sealed) in a gas tight manner in an area intermediate of the tube's inlet and outlet ends. If this type of catalyst blocking is of concern, then, in the practice of this invention, vented plugs 60 could be used in both the inlet and outlet ends of the tube to ensure that the interior of the tube can be depressurized both below and above such gas tight blockage. Depending on the reaction itself, and the catalyst used, if such a similar blockage of the interior of the tube is not of concern and depressurization of the interior of the tube can be accomplished by venting only one end of the tube, then, in accordance with this invention, a vented plug could be used only in one end of the tube since the entire tube can be de-pressured by venting only one end of the tube. In such a case a solid, non-vented plug could be employed in the opposing end of the tube and still be within the scope of this invention.

Employment of a vented plug 60 in the outlet end of the tube is desired in situations where there can be a liquid build up in the interior of the tube while it is plugged. In this way, such liquid can be drained off into a container while the tube is being de-pressurized through valve 70. This saves the individual who is removing the plug from exposure to both the gas and the liquid that collects in the tube while it is sealed off by the plugs.

If it is certain that there will be no internal gas blockage and there will be no liquid build up in the interior of tube 26 while it is plugged, then, in accordance with this invention, either only the inlet end or outlet end, which ever end is more convenient to reach at the time, can be closed with a vented plug, a non-vented, solid plug being employed in the opposing end, but plugging only the inlet end with a vented plug will be practiced least often. Plugging either the outlet end with a vented plug or plugging both ends with a vented plug will be employed more often in the practice of this invention.

Figure 5:
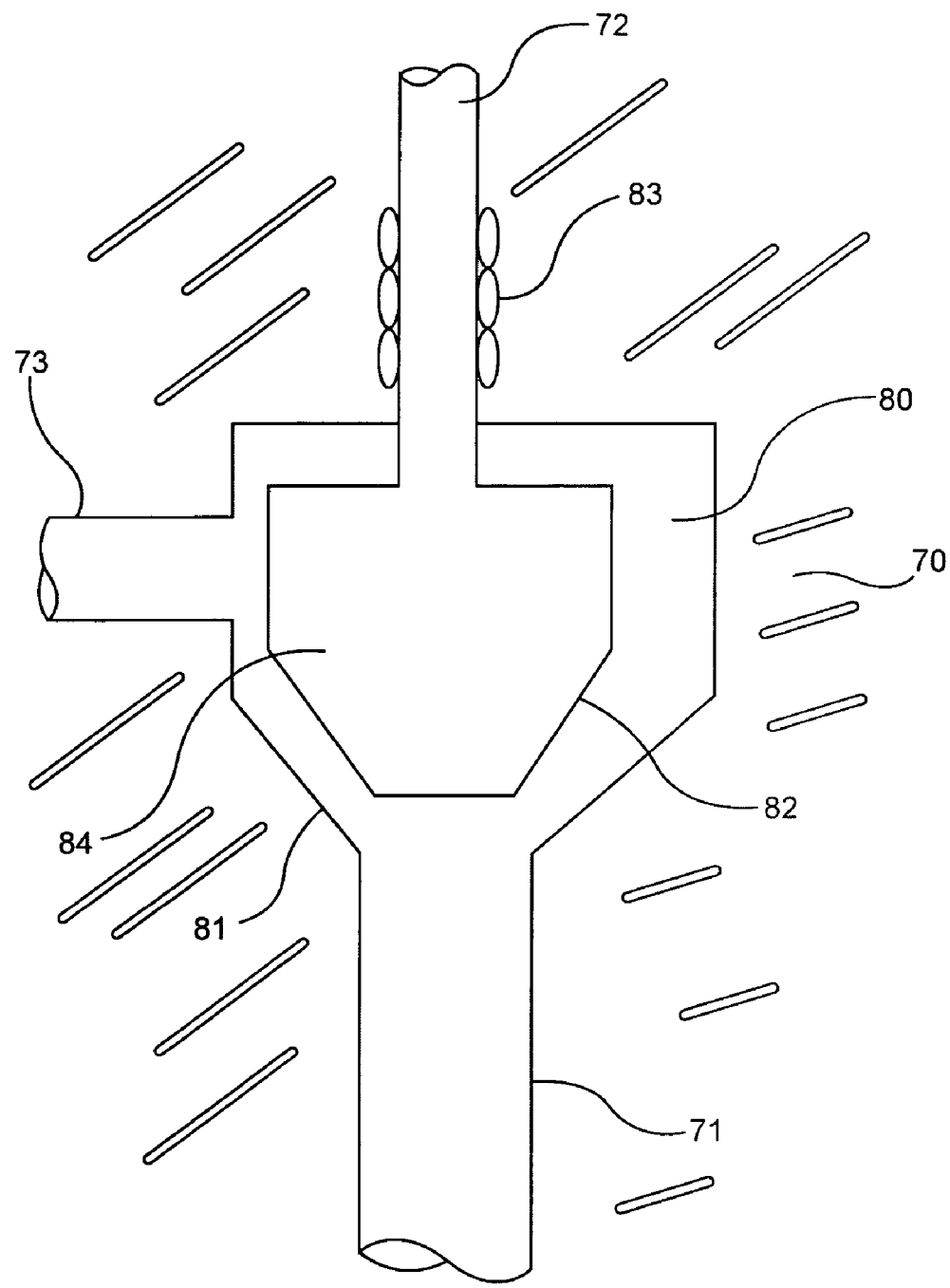
FIG. 5 shows one embodiment of apparatus useful in the plug of FIG. 4 for opening and closing fluid communication through that plug.

FIG. 5 shows one embodiment whereby conduit 71 is made so that it can be opened or closed at will, thereby making access to interior 65 of tube 26 controllable at will. In FIG. 5 a valve seat aperture 80 is inserted in the body of valve 70 in conduit 71, this aperture carrying a valve seat surface 81. Valve stem 72 extends through body 70 and into aperture 80. Stem 72 is sealed in conventional manner with suitable packing (not shown) to prevent gas/liquid leakage around stem 72 in either direction. Stem 72 carries inside aperture 80 a seal element 84 whose downwardly facing sealing surface 82 mates with surface 81 of conduit 71 to close off fluid communication through conduit 71. Stem 72 engages body 70 by threads 83 so that rotation of stem 72 moves seal 82 into or out of physical engagement with sealing surface 81, as desired.

If vented plugs have been employed in both the inlet and outlet ends of tube 72, after tube interior 65 has been emptied of pressurized gas and/or liquid, a purge gas such as nitrogen or other inert gas can be passed through interior 65 under pressure to sweep away any remaining gas or liquid from interior volume 65.

The vented valves employed pursuant to this invention can be physically restrained by means of a conventional tie wire or other physical restraint to ensure that valve stem 72 is not inadvertently rotated and valve 70 opened before venting of interior 65 is desired. For example, a hole can be drilled through cap 85, see FIG. 4, and a tie wire passed through this hole. The tie wire can then be secured to valve 70 in any manner which prevents cap 85 and stem 72 from being rotated out of the closed position without first removing the tie wire.

With the prior art practices, when a tube became faulty, the options available to an operator were to spend the time now to correct the problem with the affected tube or tubes or risk having to abandon the tube permanently using non-vented plugging procedures. With this invention there is now another option of delaying remediation of the tube until a later, more convenient and efficient time for the operator. This invention affords an operator a heretofore not available option of temporarily plugging a number of tubes that he could not afford to abandon permanently, because he now knows with certainty that he can later, even much later, get those tubes back into operation and recover their lost productivity. Removal of the tube plugs can be accomplished without risking injury or chemical exposure during the plug removal process.

EXAMPLE

In the formation of EO as described hereinabove, an individual circular (in lateral cross-section) tube 26 about 40 feet long that is leaking coolant into its interior is desired to be closed in a temporary manner to await repair of the leak at a later date. A non-vented, solid circular plug is hand driven into the inlet end 27 of that tube. A circular, vented plug 60 carrying valve 70, as shown in FIG. 4, is hand driven into outlet end 28 of that same tube.

Tube 26 has an internal cross-sectional diameter 68 of about 1.53 inches. The overall length (height) of plug 60 is about 2.88 inches, with area 62 being about 0.50 inches of that height, leaving about 2.38 inches of tapered length for plug 60. Plug 60 has a diameter throughout the height of area 62 of about 1.71 inches, and a diameter at end 63 of about 1.46 inches, thereby leaving a taper angle 86 of about 3 degrees.

The body of plug 60 is formed from carbon steel and has a ⅛ inch diameter passage way 61 drilled there through from end 63 to the opposing end 87 of the plug. A conventional Swagelok ss-bvm4 bleed valve 70 threadably engages passage 61, and contains an internal passage 71 and hollow extension 73 of about ⅛ inch in diameter that are in alignment with passage 61 thereby providing fluid communication from interior 65 of tube 26 through passages 61, 71, and extension 73 to the exterior of tube 26 and plug 60 outside external side 69. Valve 70 is in the closed position, and is locked in that position by a tie wire.

The thus plugged tube is left in that state while the reactor continues in operation until the reactor is shut down for normal turnaround for routine maintenance and repair of the reactor as a whole. While the turnaround specialists and their equipment are present at the reactor for turnaround work, it is most convenient and efficient then to repair the leaking tube. Accordingly, an individual enters the bottom head space of the reactor, connects a hose to extension 73, removes the tie wrap from valve 70 and opens that valve to drain both gas and liquid out of the interior of valve 70 into a closed container.

After the interior 65 of the tube has been de-pressurized and drained of any liquid present in that interior, the hose is removed, and both the inlet and outlet plugs removed by hand. The catalyst is removed from interior 65. The leaking portion of the tube is repaired and the tube otherwise prepared to be put back into operation upon restart of the reactor after turnaround is completed.

We claim:

1. In a method for temporarily sealing and reopening at least one reactor tube for later remediation and reuse of same, said at least one tube having a body that defines the exterior of said tube and an interior volume of said tube, said tube and said interior volume being terminated by opposing inlet and outlet ends, the improvement comprising employing in a temporary sealing manner in one of said inlet and outlet ends a first closure plug, said first plug having at least one first passage way that is in fluid communication between said interior volume and said exterior of said tube body, said at least one first passage way having at least one first valve cooperating there with so that said at least one first passage way can be opened and closed at will by means of operation of said at least one first valve, said first plug being employed with said at least one first passageway closed so that there is no fluid communication there through between said exterior and said interior volume of said tube, employing a second closure plug in said opposing end, and when reopening said tube first opening said at least one first passage way in said first plug to remove fluid from said interior volume prior to removing either of said first and second plugs from said outlet and inlet ends.

2. The method of claim 1 wherein said second plug has at least one second passage way and at least one second valve that can open and close, said second passage way being in fluid communication between said exterior and said interior volume of said tube body.

3. The method of claim 2 wherein said first plug is employed in said outlet end and is opened first to remove fluid from said interior volume to said exterior, and after said fluid is removed at least in part through said first plug, said second plug is opened.

4. The method of claim 3 wherein said interior volume contains both pressurized gas and liquid and said first plug is opened first to remove said liquid with assistance from said pressurized gas.

5. The method of claim 2 wherein said second plug is opened to remove any gas from said interior volume that cannot be removed by way of said first plug.

6. The method of claim 2 wherein after both said first and second plugs have been opened passing a purge gas through said first and second plug passage ways and said interior volume to sweep remaining fluid from said interior volume.

7. The method of claim 1 wherein said first and second valves are physically restrained to prevent premature opening of said first passage way.

8. The method of claim 1 wherein said fluid removed from said interior volume is passed to a closed container.

9. The method of claim 8 wherein said container contains at least one absorbent for taking up and holding at least part of said fluid that is removed from said interior volume.

* * * * *